United States Patent [19]

Schindler, deceased et al.

[11] 3,783,161

[45] *Jan. 1, 1974

[54] DERIVATIVES OF DIBENZO(B,F) PYRROLO (3,4-D)AZEPINE AS CNS - DEPRESSANTS

[75] Inventors: Walter Schindler, deceased, late of Basel, Switzerland; Hans Blattner; Leonhard Gysin, both of Basel, Switzerland executors

[73] Assignee: Ciba-Geigy Corporation, Ardsley, N.Y.

[ * ] Notice: The portion of the term of this patent subsequent to Jan. 18, 1989, has been disclaimed.

[22] Filed: Aug. 23, 1972

[21] Appl. No.: 283,011

Related U.S. Application Data

[62] Division of Ser. No. 142,390, May 11, 1971.

[30] Foreign Application Priority Data

May 13, 1970  Switzerland.......................... 7069/70

[52] U.S. Cl............................... 424/274, 200/326.9

[51] Int. Cl............................................ A61k 27/00
[58] Field of Search.................. 200/326.9; 424/274

[56] References Cited
UNITED STATES PATENTS
3,636,046  1/1972  Blattner et al.................. 260/326.9

*Primary Examiner*—Stanley J. Friedman
*Attorney*—Harry Goldsmith et al.

[57] ABSTRACT

Compounds of the class of 1,2,3,8-tetrahydrodibenzo[b,f]pyrrolo[3,4-d]azepines which may be substituted in the 5-/ or 6-/ and/or 8-position by chlorine, the trifluoromethyl group or alkyl groups respectively or the allyl group respectively and pharmaceutically acceptable addition salts thereof have a depressant effect on the central nervous system; they can be prepared from the corresponding N-substituted 10,11-bis-bromomethyl-5H-dibenz[b,f]azepines and a primary amine; the compounds are active ingredients of pharmaceutical compositions.

2 Claims, No Drawings

DERIVATIVES OF DIBENZO(B,F) PYRROLO (3,4-D)AZEPINE AS CNS - DEPRESSANTS

This is a division of application Ser. No. 142,390, filed May 11, 1971.

DETAILED DESCRIPTION

The present invention relates to new azepine derivatives, processes for their production, medicaments containing the new compounds, and their use.

More particularly, the present invention relates to compounds of the formula

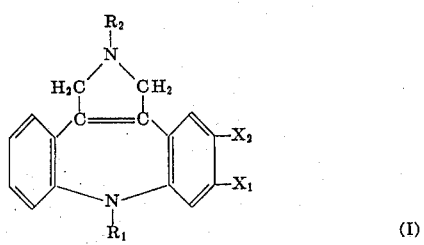

(I)

wherein $R_1$ and $R_2$ are hydrogen, alkyl groups having at most four carbon atoms, or the allyl group, $X_1$ is hydrogen, chlorine, or the trifluoromethyl group, and $X_2$ is chlorine if $X_1$ is hydrogen, or hydrogen if $X_1$ is chlorine or the trifluoromethyl group, and the pharmaceutically acceptable addition salts thereof.

In the compounds of formula I $R_1$ and $R_2$ as alkyl groups having at most four carbon atoms are e.g., the methyl, ethyl, propyl, isopropyl, butyl, isobutyl or the sec. butyl group.

Preferred members of this class are:
2-ethyl-6-chloro-1,2,3,8-tetrahydro-dibenzo[b,f]pyrrolo[3,4-d]azepine
2-methyl-5-chloro-1,2,3,8-tetrahydro-dibenzo[b,f]pyrrolo[3,4-d]azepine
2-ethyl-6-chloro-8-methyl-1,2,3,8-tetrahydro-dibenzo[b,f,]pyrrolo[3,4-d]azepine
2-methyl-5-chloro-8-methyl-1,2,3,8-tetrahydro-dibenzo[b,f]pyrrolo[3,4-d]azepine and the pharmaceutically acceptable acid addition salts thereof.

Compounds of the formula I and the pharmaceutically acceptable acid addition salts thereof have valuable pharmacological properties. They exert in particular after oral, rectal and parenteral administration a central depressant action on the central nervous system. For example they reduce motility, potentiate the action of anaesthetics, and counteract the effect of amphetamine. Moreover, they have an adrenolytic and histamine-antagonistic action. These properties are determined by selected standard tests [cp.R.Domenjoz and W. Theobald, Arch. Int. Pharmacodyn. 120, 450 (1959), W. Theobald et al., Arzneimittelforsch. 17, 561 (1967) and W. Theobald and R. Domenjoz, Arzneimittelforsch. 8, 18 (1958) ].

Thus, merely by illustration, it is demonstrated that 2-methyl-5-chloro-1,2,3,8-tetrahydro-dibenzo[b,f]pyrrolo [3,4-d]azepine in the form of the hydrochloride salt effects a 50 percent decrease of orientation motility after intraperitoneal administration on mice in an amount of 0,77 mg/kg.

The same compound subcutaneously administered in an amount of 10 mg/kg to mice, which had been anaesthetised by intraperitoneal administration of 40 mg/kg of the short-acting anaesthetic N,N-diethyl-2-methoxy-4-allyl-phenoxyacetic acid amide potentiates, i.e. prolongs the effect of the anaesthetic to a significant extent.

The same compound exerts an adrenolytic effectiveness which is found equal to the activity of 2-(N'-p-tolyl-N'-m-hydroxyphenyl-aminomethyl)-imidazolidinmethansulfonate.

The same compound effects an antagonism against histamine which is found equal to the activity of N,N-dimethyl-N'-phenyl-N'-benzylethylenediamine-hydrochloride.

Similar results are found with 2-ethyl-6-chloro-1,2,3,8-tetrahydro-dibenzo [b,f]pyrrolo[3,4-d]azepine, the 2-ethyl-6-chloro-8-methyl-1,2,3,8-tetrahydro-dibenzo [b,f]pyrrolo[3,4-d]azepine and the 2-methyl-5-chloro-8-methyl-1,2,3,8tetrahydro-dibenzo[b,f]pyrrolo[2,4-d]azepine.

Although the hydrochloride salts are preferred, also other pharmaceutically acceptable acid addition salts can be used.

The pharmacological properties of the compounds of the present invention render them suitable for the treatment of states of tension and agitation of psychic and muscular genesis.

The compounds of the formula I are produced according to the invention by reacting a compound of formula II

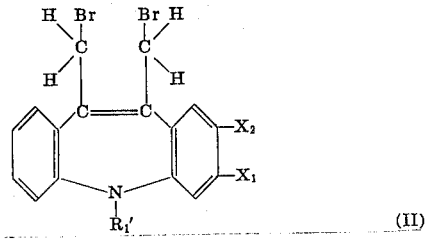

(II)

wherein $R_1'$ is methyl, ethyl, propyl, isopropyl, butyl, isobutyl or sec.butyl or a group which by means of hydrolysis can be replaced by hydrogen, and $X_1$ and $X_2$ have the meaning given under formula I, with an amine of the general formula III:

(III)

wherein $R_2$ has the meaning given under formula I, hydrolysing, the reaction product if $R_1'$ is a group which can be replaced by hydrogen by means of hydrolysis, and, optionally, converting an obtained compound of the general formula I with an inorganic or organic acid into an addition salt.

The bisbromomethyl compounds of the general formula II are reacted with the free bases of the general formula III in the presence of a solvent. Suitable solvents are those which are inert under the reaction conditions, e.g. hydrocarbons such a benzene or toluene, halogenated hydrocarbons such as chloroform, lower alkanols such as methanol or ethanol, ethereal liquids such as ether or dioxane, as well as lower alkanones such as acetone, methyl ethyl ketone, or diethyl ketone. The reaction temperature is preferably between 20° and 100°C. For the bonding of the hydrogen bromide eliminated in the reaction according to the invention, an appreciable excess of base of the general formula III is preferably used.

Groups $R_1'$ convertible by hydrolysis into the hydrogen atom are, e.g. acycl radicals, e.g. lower alkanoyl groups having preferably one–four carbon atoms, such as, e.g. the acetyl group, arenecarbonyl groups such as the benzoyl group, radicals of monofunctional derivatives of carbonic acid such as, e.g. the methoxycarbonyl, ethoxycarbonyl, or the phenoxycarbonyl group. Hydrolysis can be performed with the aid of an alkali metal hydroxide, e.g. potassium or sodium hydroxide, preferably at the boiling temperature of the reaction mixture, either in a higher-boiling organic solvent containing hydroxyl groups, such as, e.g. ethylene glycol or diethylene glycol, or in a lower monoalkyl ether of such a glycol, and, in particular, in a lower alkanol, e.g. methanol or ethanol, Furthermore, hydrolysis may by performed, e.g. also in acid medium, e.g. in alkanolic hydrochloric acid, or with the aid of hydrogen bromide in water or glacial acetic acid.

A group of starting materials of the general formula II are compunds which are substituted in the 5-position by an acyl radical. A compound falling into this group is 2-chloro-5-acetyl-10,11-bisbromomethyl-5H-dibenz[b,f]azepine. This compound can, for example, be produced as follows: Starting with 2-chloro-9-methylacridine [cp. A. Campbell et al., J.Chem.Soc. (London) 1958, 1145] this yields with acetaldehyde, in the presence of tert.butyl hydroperoxide and ferrosulphate-heptahydrate: methyl-(2-chloro-9-methyl-acridan-9-yl)-ketone; this ketone is reduced, with the aid of sodium borohydride, to 2-chloro-α,9-dimethyl-9-acridanmethanol; the obtained reduction product is re-arranged in dilute sulphuric acid according to Wagner-Meerwein to give 2-chloro-10,11-dimethyl-5H-dibenz[b,f]azepine, and dehydrated. The obtained azepine derivative is acylated with acetic acid anhydride to obtain 2-chloro-5-acetyl-10,11-dimethyl-5H-dibenz[b,f]azepine, which is subsequently brominated with the aid of N-bromosuccinimide. Further compounds of the general formula II which are substituted in 5-position by an acyl radical can be produced analogously.

A second group of starting materials of the general formula II are compounds which are substitued in 5-position by a lower alkyl group. They can be produced, starting with a 2- or 3-substituted 9-methyl-10-alkylacridinium salt, by processes analogous to those for producing the compounds of the first group of starting materials. A compound contained in the second group is 2-chloro-5-methyl-10,11-bisbromo-methyl-5H-dibenz[b,f]azepine. It can be produced by the mentioned process starting with a 2-chloro-9,10-dimenthyl-acridinium-halide by way of the intermediates: methyl-(2-chloro-9,10-dimethyl-acridan-9-yl)-ketone, 2-chloro-α,9,10-trimethyl-9-acridanmethanol, and 2-chloro-5,10,11-trimethyl-5H-dibenz[b,f]azepine.

A second process according to the invention for the production of formula I comprises alkylating a compound of the formula IV:

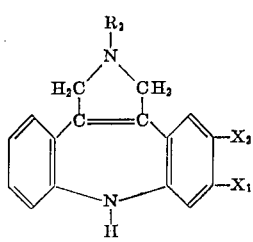

(IV)

wherein $R_2$, $X_1$ and $X_2$ have the meaning given under formula I, preferably in the presence of solvents and basic condensation agents, by means of a reactive ester of an alkanol of formula V:

$R_1'' — OH$ (V)

in which
$R_1''$ has the meaning given under formula I for $R_1$ with the exception of hydrogen;
and, if desired, converting the obtained compounds with inorganic or organic acids into their addition salts.

Starting materials of the general formula IV can be produced analogously to the first process by reaction of 5-acyl-10,11-bisbromomethyl-5H-dibenz[b,f]azepine derivatives of the general formula II with an amine of the general formual III, and hydrolysing the obtained acyl compound.

Used as the second reaction component are reactive esters of alkanols of the general formula V. As reactive esters it is possible to use, e.g. halides such as chlorides, bromides or iodides, sulphonic acid esters such as methanesulphonic acid ester, benzenesulphonic acid ester, o- and p-toluenesulphonic acid ester or 2,4-dinitrobenzenesulphonic acid ester, as well as sulphuric acid ester such as dimethyl or diethyl sulphate.

The reaction according to the invention can be performed in the presence or absence of an inert organic solvent. Suitable inert solvents are, e.g. hydrocarbons such as benzene, toluene, xylene, cumol or tetralin, ethereal liquids such as dioxane, alkanones such as acetone or methyl ethyl ketone, carboxylic acid amides such as dimethylformamide, phosphoric acid amides such as hexamethylphosphoric acid triamide, or sulphoxides such as dimethyl- or diethylsulphoxide. Suitable basic condensation agents are, e.g. alkali metals such as sodium, potassium or lithium, alkali hydroxides such as sodium or potassium hydroxide, alkali metal carbonates such as potassium carbonate, alkali metal amides such as sodium-, potassium- or lithiumamide, alkali metal hydrides such as sodium or lithium hydride, alkali metal alkanolates such as sodium methylate, sodium ethylate, or sodium-tert. butylate, or alkyl- and aryllithium compounds such as butyl- or phenyllithium. The reaction temperature is preferably 0° to 100°C.

A third process according to the invention for the production of compounds of the general formula I comprises reducing a compound of the general formula VI:

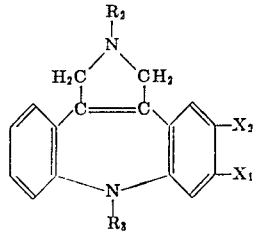

(VI)

wherein

R₃ represents an alkanoyl group having at most 4 carbon atoms, and

R₂, X₁ and X₂ have the meaning given under formula I, by means of diborane in an ethereal liquid; and converting the obtained compound of the general formula I if desired into an addition salt with an inorganic or organic acid.

As the reaction medium can be used, e.g. tetrahydrofuran, dioxane, ethylene glycol dimethyl ether, or diethylene glycol dimethyl ether. The reaction temperature is preferably between room temperature and ca. 100°C, and the reaction duration between ca. 30 minutes and 25 hours. The diborane is formed, e.g. from boron trifluoride-etherate and sodium borohydride, either in a separate apparatus and then fed into the reaction mixture, or in situ.

The preparation of the starting materials of the general formula VI wherein R₃ as the alkanoyl group can be the formyl, acetyl, propionyl, butyryl, or isobutyryl group was described following the first process.

A fourth process according to the invention, for the preparation of compounds of formula I comprises hydrolysing a compound of the general formula VII:

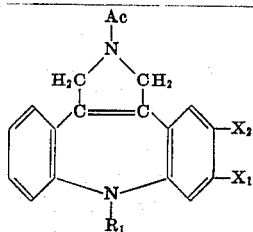

(VII)

in which

Ac is the acyl radical of an organic acid, and

R₁, X₁ and X₂ have the meaning given under formula I;

and converting an obtained compound of the general formula I, if desired, into an addition salt with an inorganic or organic acid.

In the starting materials of the general formula VII, Ac is as an acyl radical, in particular, the cyano or chlorocarbonyl group, an alkanoyl or arenecarbonyl group, or the radical of a monofunctional derivative of carbonic acid, thiocarbonic acid, or dithiocarbonic acid. Mentioned as examples are: for alkanoyl or arenecarbonyl groups the acetyl or benzoyl group; for radicals of monofunctional derivatives of carbonic acid, thiocarbonic acid, or dithiocarbonic acid the methoxycarbonyl, ethoxycarbonyl, tert.butoxycarbonyl, phenoxycarbonyl, benzyloxycarbonyl, methoxythiocarbonyl, ethoxythiocarbonyl, methylthiocarbonyl, or the ethylthiothiocarbonyl group.

The hydrolysis of compounds of the general formula VII is effected, for example, by several hours' heating of such compounds in an alkanolic or aqueous-alkanolic alkali hydroxide solution, e.g. by boiling in a mixture of potassium or sodium hydroxide with ethanol or methanol and a little water. Instead of lower alkanols, it is possible to use also other solvents containing hydroxyl groups, such as ethylene glycol or its lower monoalkyl ethers. Furthermore, it is possible to hydrolyse, in particular, compounds of the general formula VII wherein Ac is the cyano group also by heating with a mineral acid in organic-aqueous or aqueous medium, e.g. by several hours' boiling in a mixture of 85 percent phosphoric acid and formic acid, or by several hours heating in 48 percent hydrobromic acid to ca. 60° to 120°C.

The starting materials of the general formula VII are, in their turn, produced, e.g. from compounds of the general formula VIII:

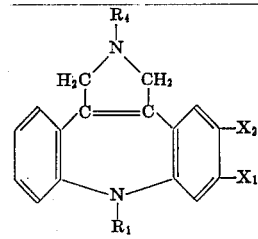

(VIII)

wherein

R₄ is a lower alkyl group, the allyl or benzyl group, and

R₁, X₁ and X₂ have the meaning given under formula I, by allowing to act on the stated compounds, at room temperature or at elevated temperature, an organic acyl halide, e.g. a cyanogen halide, especially cyanogen bromide, also phosgene, a chloroformic acid alkyl ester, e.g. the chloroformic acid methyl ester, also the chloroformic acid phenyl ester or chloroformic acid benzyl ester, the chloride or bromide of a lower alkanoic acid or of benzoic acid, especially acetyl chloride, acetyl bromide, or benzoyl chloride, whereby occurs according to the von Braun reaction the desired acylation with liberation of the alkyl, allyl or benzyl halide corresponding to the group R₄. The reaction is carried out in an inert organic solvent such as, e.g. chloroform or benzene or, optionally, also in an excess of an acyl halide suitable as reaction medium.

Compounds of the general formula VIII can, on the other hand, be produced analogously to the first process by reacting a compound of the general formula II with an amine of the general formula IX:

(IX)

wherein R₄ has the meaning given under formula I.

The compounds of the general formula I obtained by the processes according to the invention are, optionally, subsequently converted in the usual manner into their addition salts with inorganic and organic acids. For example, to a solution of a compound of the general formula I in an organic solvent is added the acid desired as salt component, or a solution of the acid. Preferably chosen for the reaction are organic solvents in which the formed salt is difficultly soluble, so that it can be separated by filtration. Such solvents are, e.g. methanol, ether, acetone, methyl ethyl ketone, acetone/ethanol, methanol/ether, ethanol/ether, or methylene chloride/ethanol.

For use as medicaments it is possible to use, instead of free bases, pharmaceutically acceptable acid addition salts, i.e. salts with such acids of which the anions are not toxic in the dosages in question. It is moreover of advantage if the salts to be used as medicaments crystallise well and are not, or only slightly, hygroscopic. For salt formation with compounds of the general formula I it is possible to use, e.g. hydrochloric acid, hydrobromic acid, sulphuric acid, phosphoric acid, methanesulphonic acid, ethanesulphonic acid, β-hydroxyethanesulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid, and embonic acid.

As previously mentioned, the new active substances are administered orally, rectally, or parenterally. The dosage depends on the manner of application, on the species, on the age, and on the individual condition. The daily dosages of the free bases, or of pharmaceutically acceptable salts thereof, vary between 0.1 mg/kg and 10.5 mg/kg for warm-blooded animals. Suitable dosage units, such as dragees, tablets, suppositories or ampoules, preferably contain 5–200 mg of an active substance according to the invention, or of a pharmaceutically acceptable salt thereof.

Dosage units for oral administration contain, as active substance, preferably between 1 and 90 percent of a compound of the general formula I, or of a pharmaceutically acceptable salt thereof. They are produced by combining the active substance, e.g. with solid pulverulent carriers such as lactose, saccharose, sorbitol, mannitol; starches such as potato starch, maize starch, or amylopectin, also laminaria powder or citrus pulp powder; cellulose derivatives or gelatine, optionally with the addition of lubricants such as magnesium or calcium stearate, or polyethylene glycols, to form tablets or dragee cores. The dragee cores are coated, e.g. with concentrated sugar solutions which can also contain, e.g. gum arabic, talcum and/or titanium dioxide; or they are coated with a lacquer dissolved in readily volatile organic solvents or mixtures of solvents. Dyestuffs may be added to these coatings, e.g. for identification of different dosages of active substance.

Further suitable oral dosage units are hard gelatine capsules, as well as soft closed capsules made from gelatine and a softener, such as glycerin. The hard capsules contain the active substance preferably as a granulate, e.g. in admixture with fillers such as maize starch, and/or lubricants such as talcum or magnesium stearate, and, optionally, stabilisers such as sodium metabisulphite ($Na_2S_2O_5$), or ascorbic acid. In soft capsules, the active substance is preferably dissolved or suspended in suitable liquids, such as liquid polyethylene glycols, whereby likewise stabilisers may be added.

Suitable dosage units for rectal administration are, e.g. supppositories consisting of a combination of an active substance, or of a suitable salt thereof, with a suppository foundation substance. Suitable as a suppository foundation substance are, e.g. natural or synthetic triglycerides, paraffin hydrocarbons, polyethylene glycols, or higher alkanols. Also suitable are gelatine rectal capsules consisting of a combination of the active substance, or of a suitable salt thereof, and a foundation substance. Suitable as a foundation substance are, e.g. liquid triglycerides, polyethylene glycols, or paraffin hydrocarbons.

Ampoules for parenteral administration, especially intramuscular administration, preferably contain a water-soluble salt of an active substance in a concentration of preferably 0.5 – 5 percent, optionally together with suitable stabilisers and buffer substances, in aqueous solution.

The following directions further illustrate the production of tablets, dragees, capsules, suppositories, and ampoules:

a. An amount of 250 g of 2-ethyl-6-chloro-1,2,3,8-tetrahydrodibenzo [b,f]pyrrolo[3,4-d]azepine hydrochloride is mixed together with 175.80 g of lactose and 169.70 g of potato starch; the mixture is moistened with an alcoholic solution of 10 g of stearic acid, and granulated through a sieve. After drying of the granulate, 160 g of potato starch, 200 g of talcum, 2.50 g of magnesium stearate, and 32 g of colloidal silicon dioxide are mixed in, and the mixture is pressed to form 10,000 tablets each weighing 100 mg and each containing 25 mg of active substance. The tablets can, if required, be provided with grooves for a more precise adjustment of the dosage amount.

b. A granulate is produced from 250 g of 2-ethyl-6-chloro-1,2,3,8-tetrahydrodibenzo[b,f]pyrrolo [3,4-d]azepine hydrochloride, 175.90 g of lactose, and the alcoholic solution of 10 g of stearic acid. After drying, the granulate is mixed with 56.60 g of colloidal silicon dioxide, 165 g of talcum, 20 g of potato starch, and 2.50 g of magnesium stearate; the mixture is then pressed to form 10,000 dragee cores. These are subsequently coated with a concentrated syrup made from 502.28 g of crystallised saccharose, 6 g of shellac, 10 g of gum arabic, 0.22 g of dyestuff, and 1.5 of titanium dioxide. After drying, the obtained dragees each weigh 120 mg and each contain 25 mg of active substance.

c. To produce 1,000 capsules each containing 25 mg of active substance, 25 g of 2-ethyl-6-chloro-1,2,3,8-tetrahydrodibenzo[b,f]pyrrolo[3,4-d]azepine hydrochloride are mixed with 248.0 g of lactose; the mixture is then evenly moistened with an aqueous solution of 2.0 g of gelatine, and granulated through a suitable sieve (e.g. sieve III according to Ph.Helv. V). The granulate is mixed with 10.0 g of dried maize starch and 15.0 g of talcum, and the mixture then evenly filled into 1,000 hard gelatine capsules, size 1.

d. A suppository foundation substance is prepared from 2.5 g of 2-ethyl-6-chloro-1,2,3,8-tetrahydrodibenzo-[b,f]pyrrolo[3,4-d]azepine hydrochloride and 167.5 g of adeps solidus; with this amount of substance are then poured 100 suppositories each containing 25 mg of active substance.

e. A solution of 25 g of 2-ethyl-6-chloro-1,2,3,8-tetrahydrodibenzo[b,f]pyrrolo[3,4-d]azepine hydrochloride in one litre of water is filled into 1,000 ampoules, and then sterilised. An ampoule contains a 2.5 percent solution of 25 mg of active substance.

As active substance for tablets, dragees, capsules, suppositories, and ampoules it is also possible to use the same amount of the following compounds:

2-methyl-5-chloro-1,2,3,8-tetrahydrodibenzo[b,f-]pyrrolo [3,4-d]azepine hydrochloride, 2,8-dimethyl-5-chloro-1,2,3,8-tetrahydrodibenzo[b,f]pyrrolo[3,4-d]azepine hydrochloride, and 2-ethyl-6-chloro-8-methyl-1,2,3,8-tetrahydrodibenzo[b,f]pyrrolo[3,4-d]azepine hydrochloride.

The following examples further illustrate the production of the new compounds of the general formula I and of intermediates not described hitherto; the examples do not, however, limit in any way the scope of the invention. The temperatures are given in degrees Centigrade, and the silica gel used as an adsorbent is Silicagel Merck, particle size 0.05 – 0.2 mm.

EXAMPLE 1 a. An amount of 20 g (0.088 mol) of finely ground 3-chloro-5H-dibenz[b,f]azepine (cp. J.R. Geigy A.G., French Patent 1,274,413) is refluxed in 600 ml of 48 percent hydrobromic acid for 90 minutes. The reaction mixture is then cooled with ice, whereby a portion of the formed 3-chloro-9-methyl-acridine-hydrobromide precipitates. To the obtained suspension are added in portions, with ice cooling, 450 ml of concentrated ammonia solution, and the mixture is extracted with ether. The ethereal solution is washed with water, and extracted with 300 ml of 1-n sulphuric acid. If the crude product precipitates as sulphate, then it is again dissolved by the addition of water. The ether solution is washed three times with water, and the washing water combined with the acid extract. The aqueous acid solution is treated with active charcoal, filtered, and the light-yellow filtrate made alkaline with concentrated ammonia. The precipitated base is taken up in ether; the ether solution is dried over magnesium sulphate, filtered, and concentrated in vacuo. The residue is taken up in hot hexane, the hexane solution purified with active charcoal, filtered, and the solution concentrated by evaporation. The obtained 3-chloro-9-methyl-acridine, M.P. 117°–118°, crystallises out.

b. An amount of 22.7 g (0.100 mol) of the acridine derivative obtained according to a) is dissolved, by heating, in 120 ml of 2-n sulphuric acid. The solution is cooled, and diluted with 120 ml of ice water; it is then placed into an ice/sodium chloride bath, and to the solution are added, at 9°, 29 ml (0.512 mol) of ice cold acetaldehyde. The temperature of the mixture rises to 15°C; it is cooled, with stirring, to 8°, and to it are added dropwise and simultaneously, with stirring, a solution cooled to 4° of 144 g (0.520 mol) of ferrosulphate-heptahydrate in 480 ml of water, and 60 ml (0.450 mol) of 75 percent tert.butyl-hydroperoxide (Fluka) cooled to 2°. The reaction solution is vigorously stirred during the addition, and the dropping rate so adjusted that the temperature in the reaction vessel remains between 10° and 13°. After addition of half the amount of the two reagents there is formed on the wall of the vessel a crust, which is removed. After completion of the dropwise addition, stirring is continued for a further 15 minutes, whereby the internal temperature of the reaction vessel falls to 3°. The obtained brown suspension is extracted with methylene chloride, the extract washed with water, dried over sodium sulphate, and concentrated in vacuo. The residue is dissolved in 72 ml of warm absolute benzene; the solution is then cooled, filtered through a column of 52 g of silica gel, washed afterwards with 320 ml of abs. benzene, and the benzene eluate concentrated by evaporation. The residue is recrystallised from ether/hexane, whereupon the pure methyl-(3-chloro-9-methyl-acridan-9-yl)- ketone melts at 116° – 118°.

c. An amount of 27.4 g (0.100 mol) of the ketone obtained according to b) is dissolved in 500 ml of methanol. The solution is cooled to 10°; to the solution are then added in portions within 10 minutes, in an ice bath and while stirring is maintained, 19.1 g (0.500 mol) of sodium borohydride. Stirring is continued for a further hour at 5°, and the reaction solution then concentrated in vacuo to a weight of 70 g. The addition of 6.6 ml of water and some seed crystals effect, after cooling in an ice bath, the commencement of crystallisation. Cooling with ice continues, 100 ml of water are slowly added, and the whole is allowed to stand for 1 hour at 0°. The crystals are filtered off under suction, washed with water until neutral, and dried in vacuo over potassium hydroxide. Thus crude 3-chloro-α,9-dimethyl-9-acridan-methanol is obtained.

d. To a mixture cooled to room temperature of 200 ml of concentrated sulphuric acid/water (10:1) (volume ratios) are added within a quarter of an hour, with vigorous stirring, 27.4 g (0.100 mol) of the hydroxy compound obtained according to c). The hydroxy compound passes slowly into solution, which heats up to 30°. 90 Minutes after commencement of the addition is formed the clear solution, which is stirred for a further 45 minutes. The solution is poured on to a mixture of 800 g of ice, 1 litre of water, and 500 ml of methylene chloride. The organic phase is separated, and the aqueous phase extracted with methylene chloride. The combined methylene chloride solutions are washed with water, dried over sodium sulphate, and concentrated in vacuo. The residue is dissolved in abs. benzene, and the benzene solution added to 55 g of silica gel. The adsorbent is filtered off under suction, washed out with abs. benzene/ethyl acetate (10:1), and the filtrate concentrated in vacuo. The residue is crystallised from ether/hexane, whereupon the pure 3-chloro-10,11-dimethyl-5H-dibenz[b,f]azepine, M.P. 137°–139°, is obtained.

e. An amount of 10.0 g (0.039 mol) of the azepine derivative obtained according to d) is refluxed in 100 ml of acetic anhydride for 10 minutes. The excess acetic anhydride is distilled off under vacuo at 80°; the red oil remaining behind is taken up in absolute benzene, and the solution chromatographed on a column of 120 g of silica gel. The column is washed out with 300 ml of abs. benzene, and eluted with abs. benzene/ethyl acetate (10:1). Concentration of the eluate in vacuo yields 3-chloro-5-acetyl-10,11-dimethyl-5H-dibenz[b,f]azepine, which is used as crude product.

f. An amount of 11.3 g (0.038 mol) of the compound obtained according to e) is dissolved in 110 ml of carbon tetrachloride. To the solution are added 13.7 g (0.077 mol) of N-bromosuccinimide; the obtained suspension is exposed to two 200 Watt lamps, and refluxed for 1 hour. The reaction mixture is cooled, filtered, and the filtrate concentrated in vacuo. The residue is taken up in benzene, the small amount of undissolved succinimide removed by filtration, and the filtrate concentrated in vacuo. The residue is dissolved in ether, the ether solution treated with active charcoal, filtered, and concentrated in vacuo. Thus amorphous 3-chloro-5-acetyl-10,11-bisbromomethyl-5H-dibenz[b,f]azepine is obtained.

g. An amount of 17.4 g (0.036 mol) of the compound obtained according to f) is dissolved in 350 ml of abs. benzene. This solution is cooled, and to it are added dropwise within 20 minutes, with stirring, 110 ml (0.51 mol) of a 21 percent ethylamine solution in benzene. From the reaction solution precipitates ethylamine-hydrobromide. The reaction mixture is stirred for a further 10 minutes, and is then filtered through purified diatomaceous earth. The excess ethylamine in the filtrate is evaporated off in vacuo, and the benzene solution remaining behind extracted with 1-n hydrochloric acid. The acidified extract is treated with active charcoal, filtered, and rendered alkaline with concentrated potassium hydroxide solution. The crude base precipitates as oil. It is extracted with ether, the ether extract washed neutral with water, dried over potassium carbonate, and concentrated in vacuo. Thus crude 2-ethyl-6-chloro-8-acetyl-1,2,3,8-tetrahydrodibenzo[b,f]pyrrolo[3,4-d]azepine is obtained.

h. An amount of 10.9 g (0.032 mol) of the compound obtained according to g) is dissolved in 50 ml of abs. ethanol. To the solution are added 40 ml of 20 percent ethanolic potassium hydroxide solution, the mixture is refluxed for 3 hours, and then cooled. An amount of 6.16 g of orange-coloured crystalline reaction product is filtered off under suction. To the filtrate is added 1 g of powdered potassium hydroxide; the mixture, from which 70 ml of ethanol are distilled off, is boiled for 1 hour, and cooled. A second fraction of 1.53 g of crude reaction product precipitates, and is filtered off with suction. The mother liquor is diluted with water, extracted with ether, and the ether solution extracted with 2-n hydrochloric acid. The acidified extract is treated with active charcoal, filtered, and the filtrate made alkaline with conc. potassium hydroxide solution. The precipitated base is taken up in ether, the organic phase separated, dried over potassium carbonate, and concentrated in vacuo. The residue, which is crystallised from a little ether, yields a third fraction of 1.25 g of reaction product. The combined crystallisates are recrystallised from benzene, whereupon pure 2-ethyl-6-chloro-1,2,3,8-tetrahydrodibenzo[b,f]pyrrolo[3,4-d]azepine, M.P. 193°-195° is obtained.

An amount of 7.57 g (0.025 mol) of the obtained base is dissolved in 300 ml of warm methylene chloride. To this solution are added 5.1 ml of 5.2-n abs. ethanolic hydrochloric acid. The hydrochloride precipitates. It is filtered off under suction, washed with ether, and dried in vacuo, whereupon it melts, in a sealed tube at 238°–240°.

EXAMPLE 2

An amount of 4.33 g (0.014 mol) of 2-ethyl-6-chloro-1,2,3,8-tetrahydrodibenzo[b,f]pyrrolo[3,4-d]azepine is dissolved in 50 ml of hexamethylphosphoric acid-triamide; to the obtained solution are added 3.70 ml (0.028 mol) of a 30 percent sodium amide suspension in toluene. The dark green solution is stirred for 30 minutes in a bath at 50°, cooled, and separated in vacuo from the formed gas. To the solution is then added dropwise within 5 minutes, with stirring, a solution of 0.95 ml (0.015 mol) of methyliodide in 5 ml of hexamethylphosphoric acid triamide, and stirring continues for a further 15 minutes. The brown-red coloured reaction solution is poured on to ice, diluted with a large amount of water, and made alkaline with conc. sodium hydroxide solution. The crude base precipitates. It is extracted with ethyl acetate, the ethyl acetate solution washed with water, and extracted with 2-n hydrochloric acid. The acidified extract is treated with active charcoal, rendered alkaline with conc. potassium hydroxide solution, and the precipitated base extracted with ether. The ether extract is washed with water, dried over potassium carbonate, and concentrated in vacuo. Thus crude 2-ethyl-6-chloro-8-methyl-1,2,3,8-tetrahydrodibenzo[b,f]pyrrolo[3,4-d]azepine is obtained. An amount of 3.0 g (0.0096 mol) of crude base is dissolved in ether. The ether solution is shaken with 2-n etheral hydrochloric acid, the precipitated yellow hydrochloride filtered off under suction, and dried in vacuo. It melts at 169° – 171° and contains one equivalent of crystal water.

EXAMPLE 3 a. An amount of 22.8 g (0.100 mol) of 2-chloro-9-methyl-acridine [cp. A. Campbell et al., J.Chem.Soc. (London) 1958, 1145] is reacted, analogously to Example 1 b), in 35 ml of 2-n sulphuric acid and 65 ml of ice water with 7.2 ml (0.128 mol) of acetaldehyde, 15 ml (0.114 mol) of 75 percent tert.butylhydroperoxide and 36 g (0.130 mol) of ferrosulphateheptahydrate, dissolved in 120 ml of water, to give methyl-(2-chloro-9-methyl-acridan-9-yl)-ketone, M.P. 134° – 135° (from ether/hexane).

b. An amount of 3.11 g (0.0114 mol) of the ketone obtained according to a) is dissolved in 40 ml of methanol. To the solution are added 0.50 g (0.013 mol) of sodium borohydride, and stirring is carried out for one hour at room temperature. The reaction mixture is carefully concentrated in vacuo, and the residue taken up in 100 ml of methylene chloride. To the methylene chloride solution is added some anhydrous magnesium sulphate; the solution is then filtered and the filtrate concentrated in vacuo. Thus crude 2-chloro-α,9-dimethyl-9-acridanmethanol is obtained, which is further processed as crude product.

If the obtained compound is not further used straight away, it has to be stored at 0°.

c. An amount of 15.1 g (0.055 mol) of the hydroxy compound obtained according to b) is stirred in 300 ml of concentrated sulphuric acid/water (10:3) (volume ratios) at room temperature until a solution is formed. The reaction mixture is then further stirred for 30 minutes at the same temperature and then added, with stirring, to a mixture of 700 ml of 50 percent potassium hydroxide solution and 2 kg of ice. The obtained suspension is diluted with water, so that the precipitated potassium sulphate dissolves, and the solution extracted with ether. The ether solution is washed with water, dried over magnesium sulphate, and concentrated in vacuo. The residue is recrystallised from ether/hexane to obtain 2-chloro-10,11-dimethyl-5H-dibenz[b,f]azepine, M.P. 137° – 138°.

d. Analogously to Example 1 e), 13.11 g (0.051 mol) of the compound obtained according to c) are refluxed with 100 ml of acetic anhydride for 15 minutes, and the obtained crude product is purified on silica gel. Thus 2-chloro-5-acetyl-10,11-dimethyl-5H- dibenz[b,f]azepine is obtained, which is used as crude product.

e. An amount of 13.50 g (0.045 mol) of the crude produuct obtained according to d) is reacted, analogously to Example 1 f), with 17.7 g (0.091 mol) of N-bromo-succinimide. The obtained crude product is purified on a column of 150 g of silica gel. As elution agent is firstly used absolute benzene, which extracts a secondary product, and afterwards a mixture of abs. benzene/ethyl acetate (10:1). The benzene/ethyl acetate eluate is concentrated in vacuo, whereupon pure yellowish, amorphous 2-chloro-5-acetyl-10,11-bisbromomethyl-5H-dibenz[b,f]azepine is obtained.

f. Within 10 minutes are added dropwise, with stirring, 100 ml (0.32 mol) of 10 percent methylamine solution in benzene to 19.0 g (0.040 mol) of the compound produced according to e), which is dissolved in 200 ml of absolute benzene, the solution being cooled with an ice bath. The dropping rate is so adjusted that the reaction temperature is 20°. Stirring is carried out for a further 30 minutes; the precipitated salt is filtered off under suction, and the filtrate concentrated in vacuo. The residue is taken up in ether, and the ether solution extracted with 1-n hydrochloric acid. The acidified extract is made alkaline with concentrated potassium hydroxide solution, and the precipitated crude base extracted with ether. The ether solution is dried over potassium carbonate, and concentrated in vacuo. Thus amorphous yellowish 2-methyl-5-chloro-8-acetyl-1,2,3,8-tetrahydrodibenzo[b,f]pyrrolo[3,4-d]azepine is obtained.

The product is affected by the air and should be stored in a cold state under nitrogen.

g. An amount of 6.63 g (0.020 mol) of the compound obtained according to f) is dissolved in 50 ml of abs. ethanol. To this solution are added 4.60 g of potassium hydroxide; the mixture is then refluxed for 5 hours under nitrogen, and afterwards cooled to 0°. The precipitated orange coloured crystals (4.61 g) are filtered off under suction, washed with a little ice cold ethanol, and dried. The filtrate is concentrated in vacuo, the residue dissolved in ether, the ether solution extracted with 2-n hydrochloric acid, and the acidified extract rendered alkaline with concentrated potassium hydroxide solution. The precipitated free base is taken up in methylene chloride, the methylene chloride solution dried over potassium carbonate, and concentrated by evaporation. The crystalline residue of 0.66 g is combined with the first fraction of crystals, and the mixture dissolved in benzene; the solution is treated with active charcoal, filtered, and concentrated. Thus 2-methyl-5-chloro-1,2,3,-8-tetrahydrodibenzo[b,f]pyrrolo[3,4-d]azepine is obtained, M.P. 210°–212°.

An amount of 5.35 g of the obtained base is dissolved in 200 ml of methylene chloride. The solution is cooled and to it are added, with stirring, 3.60 ml of 19.5 percent ethanolic hydrochloric acid. The hydrochloride of the applied base precipitates. It is cooled with ice, filtered off under suction, washed with a little methylene chloride, dried, and taken up in ethanol. The ethanol solution is treated with active charcoal and concentrated by evaporation; the obtained crystals below 0.01 mm are then dried at 100°, whereupon the reddish hydrochloride melts at 230° – 241°.

EXAMPLE 4

To 1.84 g (0.0065 mol) of 2-methyl-5-chloro-1,2,3,8-tetrahydrodibenzo[b,f]pyrrolo[3,4-d]azepine, dissolved in 50 ml of hexamethylphosphoric acid triamide, are added 1.67 ml (0.0125 mol) of a 30 percent sodium amide suspension in toluene. The reaction mixture is stirred for 30 minutes at 30°; it is then cooled and separated in vacuo from the formed gas. With water cooling are then added dropwise, with stirring, 0.43 ml (0.007 mol) of methyliodide dissolved in 5 ml of hexamethylphosphoric acid triamide. The reaction mixture is stirred for a further 15 minutes; to it are again added the same amount of sodium amide suspension, and the mixture separated in vacuo from the formed gas; the addition of the same amount of methyliodide is then repeated, and stirring again proceeds for a further 15 minutes. The mixture is afterwards poured on to ice, and extracted with ether. Because of the formation of quaternary salts, the aqueous layer remains yellow coloured. The ether solution is extracted with 2-n hydrochloric acid, the acidified extract made alkaline with concentrated potassium hydroxide solution, and the precipitated base extracted with ether. The ether solution is dried over potassium carbonate, and concentrated by evaporation. The residue is chromatographed on a column prepared from 50 g of silica gel and abs. benzene, and the crude product eluted with chloroform containing 1 percent of ethanol. The eluate is concentrated in vacuo, and the residue recrystallised from isopropanol, whereupon yellow 2,8-dimethyl-5-chloro-1,2,3,8-tetrahydrodibenzo[b,f]pyrrolo[3,4-d]azepine, M.P. 178°–190°, is obtained.

EXAMPLE 5 a. An amount of 10.0 g (0.038 mol) of 3-trifluoromethyl-9-methyl-acridine (cp. Smith, Kline & French Laboratories, U.S. Pat. No. 3,016,373) is dissolved in 200 ml of glacial acetic acid and 150 ml of 0.05-n sulphuric acid. The solution is cooled to 10°; to it are then added 11 ml (0.195 mol) of acetaldehyde, and the whole is cooled, in an ice/sodium chloride bath, again to 10°. Simultaneously are then added dropwise within 20 minutes from separate dropping funnels, whilst stirring is maintained, a solution of 55 g (0.198 mol) of ferrosulphate-heptahydrate in 180 ml of water, and 23 ml (0.175 mol) of 75 percent tert.butyl-hydroperoxide. The reaction mixture is stirred for a further one hour at room temperature, then diluted with one litre of water, and extracted with ether. The ether extract is washed until neutral with water and with a 10 percent sodium carbonate solution and water, dried over magnesium sulphate, and concentrated in vacuo. The residue is taken up in abs. benzene, the solution filtered through a column of 140 g of silica gel (Merck, grain size 0.05 – 0.2 mm), and subsequently washed with abs. benzene. The filtrate is concentrated in vacuo, and the residue recrystallised from hexane. Thus obtained is yellowish methyl-(3-trifluoromethyl-9-methyl-acridan-9-yl)-ketone, M.P. 125°–126°.

b. An amount of 5.0 g (0.016 mol) of the ketone obtained according to a) is dissolved in 50 ml of methanol; to the solution are then added 0.760 g (0.020 mol) of sodium borohydride, and the whole is stirred for 1 hour at room temperature. The reaction mixture is carefully concentrated in vacuo, and the residue taken up in 100 ml of methylene chloride. To the methylene chloride solution is added some anhydrous magnesium sulphate; the mixture is afterwards filtered, and the filtrate concentrated in vacuo. Thus obtained is crude 3- trifluoromethyl-α,9-dimethyl-9-acridan-methanol, which is further processed as crude product.

An amount of 5.00 g (0.016 mol) of the obtained hydroxy compound is added to a cooled mixture of 50 ml of conc. sulphuric acid/water (10:1) (vol.ratio). The obtained suspension is stirred for 30 minutes, whereupon it changes into a solution. The red solution is stirred for a further 30 minutes, and then poured on a mixture of 130 ml of 50 percent potassium hydroxide solution and 800 g of ice. The obtained suspension is diluted in order to dissolve the precipitated potassium sulphate, and the obtained solution extracted with ether. The ether extract is washed with water, dried over magnesium sulphate, and concentrated in vacuo. The residue is dissolved in hot hexane, the hot solution treated, for purification, with active charcoal, and the suspension filtered. The filtrate is concentrated by evaporation, whereby 3-trifluoromethyl-10,11-dimethyl-5H-dibenz[b,f]azepine, M.P. 153°–155°, crystallises out.

c. An amount of 17.0 g (0.0588 mol) of this compound and 116 ml of acetic acid anhydride are refluxed for 30 minutes followed by evaporation in vacuo to dryness. The residue is taken up in toluene and the solution obtained is evaporated in vacuo. This working-step is repeated in order to remove the acid anhydride completely, whereby 3-trifluoromethyl-5-acetyl-10,11-dimethyl-5H-dibenz[b,f]azepine is recovered as a yellow amorphous substance.

d. A mixture of 20.0 g (0.0604 mol) of the compound obtained, 185 ml of carbon tetrachloride and 27.6 g (0.755 mol) of N-bromo-succinimide is refluxed for 6 hours under simultaneous irradiation with two 200-Watt lamps. After cooling the reaction mixture is filtered and the filtrate is evaporated in vacuo, whereby a red oil is obtained which is taken up in benzene and filtered through a column of 300 g of silica gel (Merck, 0.05–0.2 mm grain size). The filtrate is evaporated in vacuo, whereby pure 3-trifluoromethyl-5-acetyl-10,11-bis-bromomethyl-5H-dibenz[b,f]azepine is recovered as a yellowish foam.

e. To an ice-cooled solution of 20 g (0.0408 mol) of the compound obtained in 145 ml of benzene a solution of 75 ml of a 19.6 percent (g/v) solution of ethylamine in benzene is added dropwise in a nitrogen atmosphere in the course of 30 minutes. The cooling bath is then removed and stirring is continued for further 30 minutes at ambient temperature, the precipitated ethylamine-hydrobromide is filtered by suction and the filtrate is evaporated in vacuo. The residue is taken up with each 250 ml of ether and water, the mixture is shaken thoroughly, the aqueous layer is separated and extracted with ether. The combined ether-extracts are extracted with three portions of each 150 ml of 2-n.hydrochloric acid. The combined acid aqueous extracts are rendered alcaline by means od conc.potassium hydroxide solution and the obtained reaction mixture is extracted with two portions of each 100 ml of methylenechloride. The organic layer is separated, dried over potassium carbonate and evaporated in vacuo, whereby 2-ethyl-6-trifluoromethyl-8-acetyl-1,2,3,8-tetrahydro-dibenzo[b,f]pyrrolo[ 3,4-d]azepine is obtained as a yellowish foam.

f. An amount of 11.0 g (0.0296 mol) of the compound prepared is dissolved in 55 ml of 96 percent ethanol and refluxed together with 7.0 g (0.125 mol) of potassium hydroxide for two hours under a nitrogen atmosphere. Then the reaction mixture is cooled in an ice-bath, whereby yellow crystals precipitate which are filtered off by suction and washed with ethanol followed by washing with ether. Thus 2-ethyl-6-trifluoromethyl-1,2,3,8-tetrahydro-dibenzo[b,f]pyrrolo[3,4-d]azepine is obtained as yellow crystals. M.P. 188°–190°.

By working up the mother liquors an additional amount of the compound is obtained.

M.P. of the pure compound: 194°.

5.1 g of the base obtained are converted to the hydrochloride according to example 3 using 3 ml of a 19.5 percent ethanolic hydrogen chloride solution. Yellow crystals; M.P. 230°–233°.

EXAMPLE 6 a. 7.2 (0.0147 mol) of the compound prepared according to example 5 d) are dissolved in 70 ml of methylenechloride and cooled to −20° in a dry nitrogen atmosphere. To this solution 45 ml of a 10 percent solution of methylamine in benzene is added dropwise whilst stirring and then stirring is continued for thirty minutes at ambient temperature. The reaction mixture is shaken with saturated aqueous sodium bicarbonate solution, the organic layer is separated, dried over magnesium sulphate and evaporated in vacuo. The residue is taken up in 100 ml of ether and the solution prepared is washed with water followed by washing with two portions of each 100 ml of 2-n.hydrochloric acid. The combined acid extracts are rendered alcaline by means of conc.sodium hydroxide solution and the mixture is extracted with two portions of each 100 ml of methylenechloride. The combined extracts are dried over magnesium sulphate and evaporated in vacuo, whereby 2-methyl-8-acetyl-6-trifluoromethyl-1,2,3,8-tetrahydro-dibenzo[b,f]pyrrolo[3,4-d]azepine is obtained as a white foam.

b. An amount of 4.9 g (0.0137 mol) of the compound obtained is dissolved in 26 ml of 96 percent ethanol and refluxed under nitrogen with 3.3 g (0.059 mol) of potassium hydroxide for one hour. After cooling the reaction mixture in an ice-bath the precipitated crystals are filtered by suction, washed with little ethanol and water and dried, whereby 2-methyl-6-trifluoromethyl-1,2,3,8-tetrahydro-dibenzo[b,f]pyrrolo[3,4-d] azepine is recovered. Yellow crystals; M.P. 195°–197°. To an ice-cold solution of 2.2 g (0.070 mol) of this base in 77 ml of methylenechloride 1.2 ml of 19.5 percent ethanolic hydrochloric acid are added and set aside for 30 minutes. The precipitate is then fitered by suction and dried in vacuo, whereby the hydrochloride of the compound is recovered. Red-brown crystals; M.P. 230°–234°.

EXAMPLE 7 a. An amount of 14.6 g (0.0307 mol) of the compound prepared according to example 3 e) is dissolved in 200 ml of benzene and 93 ml of a 21 percent solution of ethylamine in benzene are added dropwise whith stirring and external cooling. After working up the reaction mixture according to example 1 g) 2-ethyl-5-chloro-8-acetyl-1,2,3,8-tetrahydro-dibenzo[b,f]pyrrolo[3,4-d]azepine is obtained as a colourless foam which is stored under nitrogen.

b. An amount of 5.0 g (0.01475 mol) of the compound obtained is dissolved in 50 ml of ethanol, 3.28 g of potassium hydroxide are added and the mixture is refluxed under nitrogen for 2 ½ hours. After cooling the reaction mixture the crystals formed are filtered by suction. The mother liquor is saponified against by the same way using the same amounts of potassium hydroxide and ethanol respectively, whereby an additional crop of crystals is collected.

The combined crystal fractions are recrystallized from benzene whereby pure 2-ethyl-5-chloro-1,2,3,8-tetrahydro-dibenzo[b,f]pyrrolo[3,4-d]azepine is obtained. Yellow crystals; M.P. 202°–204°.

To a solution of 2.82 g of the base in 100 ml of methylenechloride 1.86 ml of 19.5 percent ethanolic hydrochloric acid are added. After standing for 30 minutes the crystals are filtered by suction and recrystallized from ethanol under nitrogen, whereby the hydrochloride is obtained; light red crystals.
M.P 232°–235°.

EXAMPLE 8 a. An amount of 25.0 g (0.0525 mol) of the compound obtained according to example 1 f) is dissolved in 200 ml of abs.benzene and 112 ml of a 10 percent methylamine solution in benzene are added dropwise in the course of 10 minutes under external ice-cooling. The occurring suspension is stirred for 30 minutes at ambient temperature and then evaporated in vacuo to dryness. The residue is taken up with each 200 ml of ether and water, shaken thoroughly and then the aqueous layer is separated whilst the organic layer is extracted with two portions of each 100 ml of 0.5-n.hydrochloric acid. The acid aqueous extracts are combined, filtered with charcoal and rendered alcaline to pH 8 by means of 2-n.sodium hydroxide solution and saturated aqueous bicarbonate solution. The occurring suspension is extracted with three portions of each 200 ml of methylenechloride, the combined extracts are dried over potassium carbonate and evaporated in vacuo. The crude base obtained is dissolved in chloroform and chromatographed through a column of the five-fold amount of silicagel (Merck 0.05–0.2 mm grain size). Then the column is washed with chloroform in order to remove impurities. Elution is effected by means of chlorform, which contains 1–2 percent of methanol.

The eluate is evaporated to dryness whereby 2-methyl-6-chloro-8-acetyl-1,2,3,8-tetrahydro-dibenzo[b,f]pyrrolo[3,4-d]azepine is obtained as a colourless amorphous substance.

b. An amount of 7.50 g (0.0234 mol) of this compound is refluxed together with 5.0 g of potassium hydroxide and 50 ml of ethanol for two hours under nitrogen. After cooling the crystals are filtered by suction, washed with water and dried in vacuo. The filtrate is concentrated, extracted with ether which is then evaporated in vacuo, whereby a further crop of crystals is recovered. Thus 2-methyl-6-chloro-1,2,3,8-tetrahydro-dibenzo[b,f]pyrrolo[3,4-d]azepine is obtained.
M.P. 196°–198°.

5.96 g of the base obtained are converted to the hydrochloride according to example 7 b) which is recrystallized from a methanol/ethanol mixture; orange crystals, M.P. 228°–231° (subl.).

EXAMPLE 9

An amount of 14.50 g (0.0152 mol) of the base obtained according to example 7 b) is dissolved in 100 ml of hexamethyl phosphoric acid triamide and then a suspension (o.0322 mol) of sodium amide in toluene is added thereto under nitrogen. The mixture is stirred at a temperature of 50° for 30 minutes and little ammonia gas formed is removed in vacuo. A solution of 2.94 g n-propyliodide in 5 ml of hexamethyl phosphoric acid triamide is added under external ice-cooling and stirring the reaction mixture at ambient temperature is continued for 15 minutes. 500 ml of water are then added with caution followed by extracting the mixture with three portions of each 250 ml of ethyl acetate. The combined extracts are washed with three portions of each 300 ml of water, dried over magnesium sulphate and evaporated in vacuo. The remaining reddish oil is dissolved in chloroform and chromatographed through a column of silicagel (Merck 0.05–0.2 mm grain size). Elution is effected with chloroform containing 1 percent of methanol followed by evaporating the solution to dryness yielding a yellow oil which crystallises on standing. Thus 2-ethyl-5-chloro-8-n-propyl-1,2,3,8-tetrahydro-dibenzo[b,f]pyrrolo[3,4-d]azepine is obtained.
M.P. 90°–92°.

4.85 g of the base are dissolved in 100 ml of methylenechloride followed by adding 2.90 ml of a 19.5 percent ethanolic hydrochloric acid solution. After standing for 10 minutes the solution is evaporated to dryness and the residue is stirred with 40 ml of ethyl acetate. The crystals obtained are filtered by suction and dried in vacuo, which represent the hydrochloride of the base.
M.P. 212°–217°.

EXAMPLE 10

An amount of 5.0 g (0.0169 mol) of the base prepared according to example 1 h) is reacted with n-propyliodide according to example 9. After working up a crude product is obtained which is dissolved in chloroform and purified through a column containing the ten-fold amount of silicagel (Merck 0.05–0.2 mm grain size). Impurities are removed from the column by washing with chloroform. Elution is effected by treating the column with chloroform containing 1 percent of methanol. The solvent is evaporated in vacuo and the residue is recrystallized from hexane whereby pure 2-ethyl-6-chloro-8-n-propyl-1,2,3,8-tetrahydro-dibenzo [b,f]pyrrolo[3,4-d]azepine is obtained; yellow platelets;
M.P. 127°–129°.

3.65 g of the base are converted to the hydrochloride according to example 9; yellow crystals;
M.P. 235–238°.

EXAMPLE 11

An amount of 4.135 g (0.01395 mol) of the base prepared according to example 1 h) is reacted with allylbromide by the method of example 9, yielding a reddish viscous oil which is purified through silicagel yielding finally 2-ethyl-6-chloro-8-allyl-1,2,3,8-tetrahydro-dibenzo[b,f]pyrrolo[3,4-d]azepine as a pale yellow oil. 3.60 g of this base are converted to the hydrochloride analogously to example 9; yellow crystals, M.P. 208°–211°.

EXAMPLE 12

An amount of 4.30 g (0.0127 mol) of the compound obtained according to example 7 a) id dissolved in a mixture of 20 ml of tetrahydrofurane and 120 ml of abs. ether; this solution is cooled with an ice-bath and then 50 ml of an 1-m.solution of diborane in tetrahydrofurane are added under a nitrogen atmosphere. The mixture is stirred for 1 hour at room temperature, diluted with 50 ml of ether and then water is added cautiously until further addition does not cause more foaming. Then 30 ml of 2-n. hydrochlorid acid are added, the whole mixture is shaken and the organic layer is separated, washed several times with water and evaporated in vacuo to dryness. The residue which is identified as being a borane-complex is refluxed with 100 ml of 2-n. hydrochloric acid and 10 ml of ethanol under nitrogen for 2 ½ hours. After cooling the clear reaction mixture is extracted with ether and the aqueous phase is rendered alcaline to pH 8 with sodium bicarbonate. A yellow emulsion is obtained which is extracted with three portions of each 50 ml of methylenechloride, the combined extracts are dried over potassium carbonate and evaporated to dryness in vacuo. The remaining yellow oil is dissolved in chloroform and chromatographed through a column of the 10-fold amount of silicagel (Merck 0.05–0.2 mm grain size). Elution is effected using chloroform containing 0.5 percent of methanol which, after evaporating to dryness, yields pure 2-ethyl-5-chloro-8-ethyl-1,2,3,8-tetrahydro-dibenzo[b,f] pyrrolo[3,4-d]azepine as a yellow oil. In the event that the elution is carried out using chloroform which contains 1 percent of methanol after evaporating the solvents the compound 2-ethyl-5-chloro-1,2,3,8-tetrahydro-dibenzo[b,f] pyrrolo[3,4-d]azepine as a side-product can be isolated. M.P. 202°–204°.

3.05 g of the base which has been prepared as the main product is converted to the hydrochloride according to example 9. After evaporation of the solvents the residue is rubbed with ether in order to induce crystallization. The crystals are filtered by suction and recrystallized under nitrogen from isopropanol. M.P. 238°–242°.

EXAMPLE 13

An amount of 6.31 g (0.0195 mol) of the compound prepared according to example 3 f) is dissolved in 30 ml of abs.tetrahydrofurane and 150 ml of abs.ether and to this solution 78.5 ml of an 1m.solution of diborane in tetrahydrofurane are added under nitrogen and external cooling with an ice bath. After 5 minutes the cooling bath is removed and the reaction mixture is stirred for 1 hour at ambient temperature. After adding 50 ml of ether, 5 ml of water are added dropwise with caution, and when foaming has ceased further 50 ml of water and 10 ml of 2-n.hydrochloric acid are added. The organic layer is separated, washed with water and evaporated in vacuo completely. The remaining borane-complex is refluxed under nitrogen with 150 ml of ethanol for 4 hours. The cooled clear solution is then extracted with ether; the aqueous phase is treated with charcoal and after filtration it is rendered alcaline to pH 8 with conc.potassium hydroxide solution and saturated sodium bicarbonate solution. An emulsion is formed thereby which is extracted with three portions of each 100 ml of methylenechloride, the organic layers are combined, dried over potassium carbonate and evaporated in vacuo, whereby a yellow oil is obtained. This is dissolved in chloroform and chromatographed through a column containing the ten-fold amount of silicagel (Merck 0.05–0.2 mm grain size). Elution is carried out with chloroform which contains 1 percent of methanol. After evaporation of the solution to dryness pure 2-methyl-5-chloro-8-ethyl-1,2,3,8-tetrahydro-dibenzo[b,f]pyrrolo[3,4-d]azepine is obtained as a yellow oil.

3.43 g of this base are converted to the hydrochloride according to example 9.
M.P. 218°–222°.

EXAMPLE 14 a. An amount of 5.50 g (0.0177 mol) of 2-methyl-5-chloro-8-formyl-1,2,3,8-tetrahydro-dibenzo[b,f]pyrrolo[3,4-d]azepine is reduced according to the method described in example 12. After evaporation of the methylenechloride extract a crystalline residue is obtained, which is recrystallized from isopropanol, whereby pure 2.8-dimethyl-5-chloro-1,2,3,8-tetrahydro-dibenzo[b,f]pyrrolo[3,4-d]azepine is obtained. Yellow crystals: M.P. 175°–190°.

4.48 g of the base obtained are converted to the hydrochloride according to example 9; pale yellow crystals. M.P. 206°–214° (subl.).

b. The compound 2-methyl-5-chloro-8-formyl-1,2,3,8-tetrahydro-dibenzo[b,f]pyrrolo[3,4-d]azepine needed as starting material for the process described under a) is prepared as follows:

An amount of 1.0 g (0.00392 mol) of 10,11-dimethyl-2-chloro-dibenz[b,f]azepine in 5 ml of water-free formic acid is refluxed for one hour followed by evaporation to dryness. The oily residue is chromatographed through a column of 10 g of silica gel (Merck 0.05–0.2 mm grain size) using a benzene/ethyl acetate mixture (3:1) as solvent as well as eluent fluid. After evaporation of the solvents 10,11-dimethyl-2-chloro-5-formyl-dibenz[b,f]azepine is obtained as a yellow foam.

c. An amount of 0.853 g (0.00301 mol) of the compound obtained is dissolved in 10 ml of carbon tetrachloride and brominated with 1.17 g (0.00662 mol) of N-bromo-succinimide at boiling temperature and simultaneous irradiation with two 200 Watt lamps. After cooling the reaction mixture the succinimide formed is filtered off and the filtrate is evaporated in vacuo, whereby the crude porduct is obtained as a brown foam which is dissolved in benzene and chromatographed through a column with 10 g of silicagel (Merck 0.05–0.2 mm grain size).

After elution of the column with benzene the solution obtained is evaporated to dryness yielding 10,11-bis-bromomethyl-2-chloro-5-formyl-dibenz[b,f]azepine as a yellow foam.

d. An amount of 1.0 g (0.00266 mol) of the compound obtained is dissolved in 10 ml of methylenechloride and to the solution 6.9 ml of a 10 percent solution of methylamine in benzene are added at a temperature of −20°. The mixture is then stirred for thirty minutes at room temperature, followed by extraction with saturated sodium bicarbonate solution. The organic layer is separated, dried over magnesium sulphate and evaporated in vacuo. The residue is taken up in 100 ml of ether, the solution is filtered and the filtrate is extracted with two portions of each 100 ml of 2-n.hydrochloric acid. The combined acid extracts are rendered alkaline to pH 8 with sodium hydroxide and sodium bicarbonate solution followed by extracting the mixture with two portions of each 50 ml of methylenechloride. The combined organic layers are dried over magnesium sulphate and evaporated in vacuo whereby the crude product is obtained as a colourless foam. This is dissolved in benzene and chromatographed through a column of 10 g of silicagel (Merck 0.05–0.2 mm grain size) followed by elution of the column with a chloroform/methanol (100:1) mixture. The filtrate is evaporated to dryness yielding 2-methyl-5-chloro-8-formyl- 1,2,3,8-tetrahydrodibenzo[b,f]pyrrolo[3,4-d]azepine as a colourless foam.

What we claim is:

1. A pharmaceutical composition comprising a central nervous system depressant amount of a compound of the formula

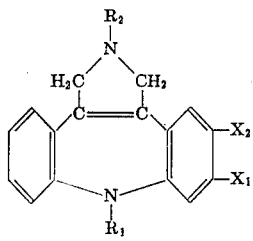

wherein
- $R_1$ and $R_2$ are hydrogen, alkyl groups having at most four carbon atoms, or the allyl group,
- $X_1$ is hydrogen, chlorine, or the trifluoromethyl group, and
- $X_2$ is chlorine if $X_1$ is hydrogen, or is hydrogen if $X_1$ is chlorine or the trifluoromethyl group, and a pharmaceutically acceptable acid addition salt thereof and a pharmaceutically acceptable carrier therefor.

2. The method of producing a depressant effect on the central nervous system of a mammal comprising administering to said mammal an effective amount of a compound according to claim 1.

* * * * *